E. WILCOX.
Wheel Cultivator.
No. 40,973. Patented Dec. 15, 1863.
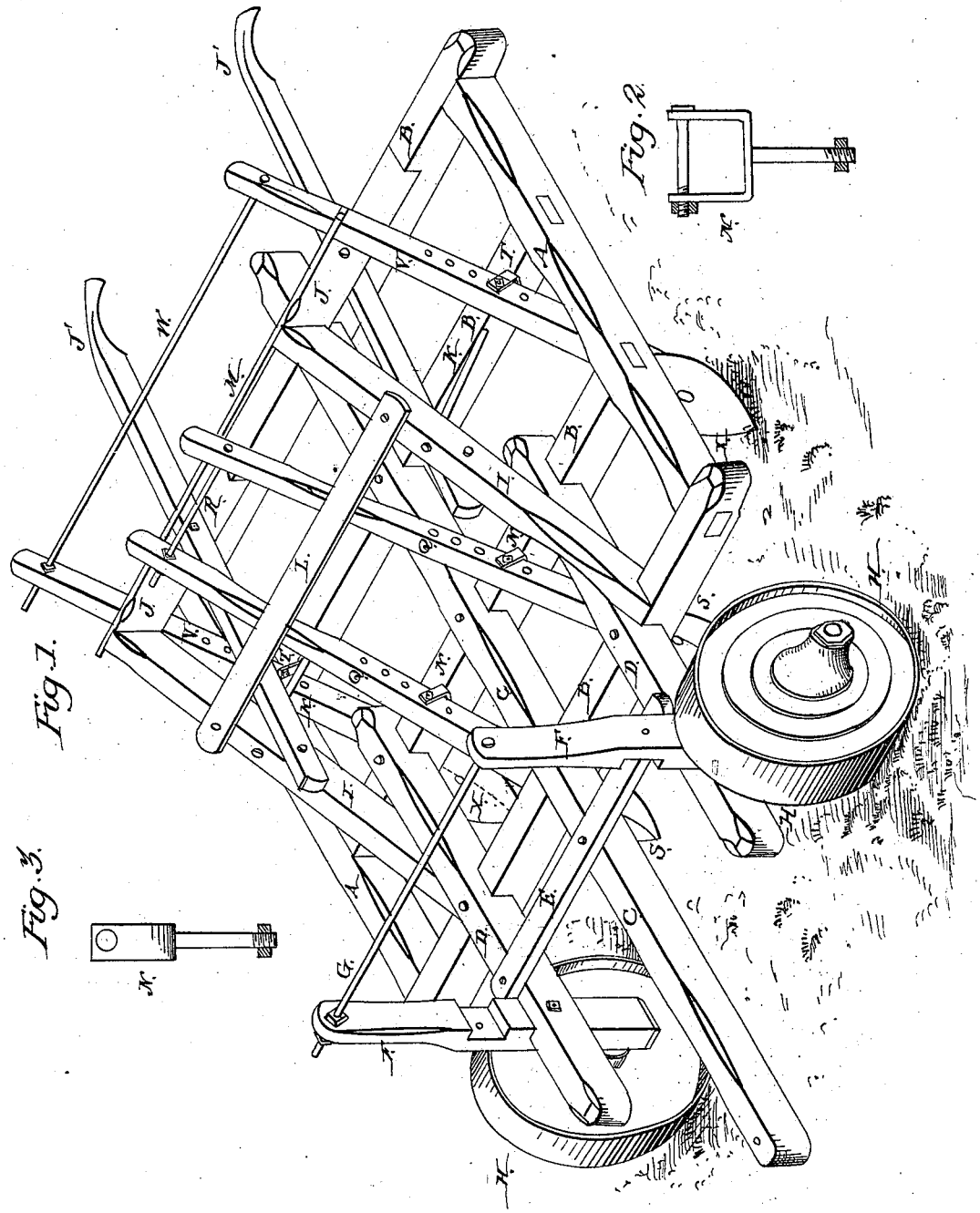

UNITED STATES PATENT OFFICE.

ERASTUS WILCOX, OF DELHI, IOWA.

IMPROVEMENT IN CULTIVATORS.

Specification forming part of Letters Patent No. 40,973, dated December 15, 1863.

*To all whom it may concern:*

Be it known that I, ERASTUS WILCOX, of Delhi township, in the county of Delaware and State of Iowa, have invented certain new and useful Improvements in Cultivators; and I do hereby declare that the same are described and represented in the following specification and drawings.

To enable others skilled in the art to make and use my improvements, I will proceed to describe their construction and operation, referring to the drawings, in which the same letters indicate like parts in each of the figures.

Figure 1 is an isometrical drawing of a cultivator with my improvements. Figs. 2 and 3 show one of the stands which hold the stocks of the shovels.

The nature of my invention and improvement in cultivators consists in the combination and arrangement of parts, as described and claimed.

In the accompanying drawings, A A are side rails connected by the bars B B, making a strong rectangular frame, to which the other parts are fastened or connected.

C is the draft-bar, to which the team is attached in some convenient manner to draw the cultivator. This bar C extends across the frame, and is fastened to each of the bars B.

The bars D D are fastened to the two front bars, B B, and are connected by the bar E to the bar C, as shown in the drawings. The standards F F are fastened to the bars D, and are connected at their upper ends by the rod G. The pivots for the wheels H H are fastened near the lower ends of the standards F F, and these standards are provided with two scores or notches each, and may be set high or low on the bars D, as required.

The inclined bars I I are fastened to the front bar B, and their upper ends are fastened to the upper ends of the inclined bars J J, which bars are fastened to the rear bar B, and the bars I I are braced by the rods K K from the bar B nearest to the rear bar.

The bars I I are connected by the bar L, and the bars J J by the bar M, and each of the handles J' J' are connected or fastened to one of each of the bars I and J, as shown in the drawings.

There are two stands, N N, (like the one shown in Figs. 2 and 3,) fastened in the bar B next to the front bar. These stands have bolts P P passing through them, on which the shovel-stocks Q Q hang so as to vibrate, and the upper ends of these shovel-stocks are connected by the rod R, which may be seized by the operator whenever he wishes to vibrate the stocks and shovels. S S are the cultivating-shovels, fastened to the lower ends of the stocks Q Q. There are some stands, T T, (similar to N,) fastened in the bar B next to the rear bar for the shovel-stocks V V to vibrate in. These shovel-stocks are connected at the top by the bar or rod W, by which the operator may vibrate them, and the cultivating-shovels X X are fastened to the lower ends of the stocks V V. When these stocks are raised up they stop against the bar M, and when they are pushed down they are stopped by the rod W striking the handles J'. When the stocks Q Q are raised up they stop against the bar L, and when they are depressed they stop against the bar M. There are two or more holes in each of the shovel-stocks, so that they may be set higher or lower in the stands.

The standards F F, to which the wheels are attached, should be attached to the bars D D at a point in front of the rectangular frame, so as to give to the shovel-stocks their proper inclination while in use in the forward movement, and to properly balance the whole machine when in operation.

I believe I have described and represented my improvements in cultivators so as to enable any person skilled in the art to make and use them without further invention or experiment.

I will now state what I desire to secure by Letters Patent:

The combination and arrangement of the frame A A B B, bars D D, and adjustable standards F F, wheels H H, inclined bars I I and J J, stands N N and T T, bars L and M, handles J' J', shovel-stocks Q and V, with cultivating-shovels S and X, the whole constructed as described.

ERASTUS WILCOX.

Witnesses:
 CHAS. HARGER,
 C. A. ROOT.